US006154844A

United States Patent [19]

Touboul et al.

[11] Patent Number: 6,154,844
[45] Date of Patent: Nov. 28, 2000

[54] SYSTEM AND METHOD FOR ATTACHING A DOWNLOADABLE SECURITY PROFILE TO A DOWNLOADABLE

[75] Inventors: Shlomo Touboul, Kefar-Haim; Nachshon Gal, Tel-Aviv, both of Israel

[73] Assignee: Finjan Software, Ltd., San Jose, Calif.

[21] Appl. No.: 08/995,648

[22] Filed: Dec. 22, 1997

Related U.S. Application Data

[60] Provisional application No. 60/030,639, Nov. 8, 1996.

[51] Int. Cl.⁷ .................................................. H04L 9/36
[52] U.S. Cl. ............................ 713/201; 714/38; 713/164
[58] Field of Search .................................. 713/201, 200, 713/202, 164, 165, 166, 167, 176; 714/38, 704, 207, 33; 709/229; 380/4, 25, 24; 705/51, 54, 55

[56] References Cited

U.S. PATENT DOCUMENTS

| | | | |
|---|---|---|---|
| 5,077,677 | 12/1991 | Murphy et al. | 395/10 |
| 5,359,659 | 10/1994 | Rosenthal | 380/4 |
| 5,361,359 | 11/1994 | Tajalli et al. | 395/700 |

(List continued on next page.)

OTHER PUBLICATIONS

X.N. Zhang, "Secure Code Distribution," Computer, pp. 76–79, Jun. 1997.

IBM AntiVirus User's Guide Version 2.4, International Business Machines Corporation, Nov. 15, 1995, pp. 6–7.

Jim K. Omura, "Novel Applications of Cryptography in Digital Communications", IEEE Communications Magazine, May, 1990; pp. 21–27.

Norvin Leach et al, "IE 3.0 Applets Will Earn Certification", PC Week, v13, n29, 1998, 2 pages.

Microsoft Authenticode Technology, "Ensuring Accountability and Authenticity for Software Components on the Internet", Microsoft Corporation, Oct. 1996, including contents, Introduction and pp. 1–10.

(List continued on next page.)

*Primary Examiner*—Robert W. Beausoliel, Jr.
*Assistant Examiner*—Christopher A. Revak
*Attorney, Agent, or Firm*—Squire, Sanders & Dempsey, L.L.P.

[57] ABSTRACT

A system comprises an inspector and a protection engine. The inspector includes a content inspection engine that uses a set of rules to generate a Downloadable security profile corresponding to a Downloadable, e.g., Java™ applets, ActiveX™ controls, JavaScript™ scripts, or Visual Basic scripts. The content inspection engine links the Downloadable security profile to the Downloadable. The set of rules may include a list of suspicious operations, or a list of suspicious code patterns. The first content inspection engine may link to the Downloadable a certificate that identifies the content inspection engine which created the Downloadable security profile. Additional content inspection engines may generate and link additional Downloadable security profiles to the Downloadable. Each additional Downloadable security profile may also include a certificate that identifies its creating content inspection engine. Each content inspection engine preferably creates a Downloadable ID that identifies the Downloadable to which the Downloadable security profile corresponds. The protection includes a Downloadable interceptor for receiving a Downloadable, a file reader coupled to the interceptor for determining whether the Downloadable includes a Downloadable security profile, an engine coupled to the file reader for determining whether to trust the Downloadable security profile, and a security policy analysis engine coupled to the verification engine for comparing the Downloadable security profile against a security policy if the engine determines that the Downloadable security profile is trustworthy. A Downloadable ID verification engine retrieves the Downloadable ID that identifies the Downloadable to which the Downloadable security profile corresponds, generates the Downloadable ID for the Downloadable and compares the generated Downloadable to the linked Downloadable. The protection engine further includes a certificate authenticator for authenticating the certificate that identifies a content inspection engine which created the Downloadable security profile as from a trusted source. The certificate authenticator can also authenticate a certificate that identifies a developer that created the Downloadable.

44 Claims, 7 Drawing Sheets

U.S. PATENT DOCUMENTS

| | | | |
|---|---|---|---|
| 5,485,409 | 1/1996 | Gupta et al. | 395/186 |
| 5,485,575 | 1/1996 | Chess et al. | 395/183.14 |
| 5,572,643 | 11/1996 | Judson | 395/793 |
| 5,623,600 | 4/1997 | Ji et al. | 395/187.01 |
| 5,638,446 | 6/1997 | Rubin | 380/25 |
| 5,692,047 | 11/1997 | McManis | 380/4 |
| 5,692,124 | 11/1997 | Holden et al. | 395/187.01 |
| 5,720,033 | 2/1998 | Deo | 395/186 |
| 5,724,425 | 3/1998 | Chang et al. | 380/25 |
| 5,740,248 | 4/1998 | Fieres et al. | 380/25 |
| 5,761,421 | 6/1998 | van Hoff et al. | 395/200.53 |
| 5,765,205 | 6/1998 | Breslau et al. | 711/203 |
| 5,784,459 | 7/1998 | Devarakonda et al. | 380/4 |
| 5,796,952 | 8/1998 | Davis et al. | 395/200.54 |
| 5,805,829 | 9/1998 | Cohen et al. | 395/200.32 |
| 5,832,208 | 11/1998 | Chen et al. | 395/187.01 |
| 5,850,559 | 12/1998 | Angelo et al. | 395/750.03 |
| 5,859,966 | 1/1999 | Hayman et al. | 713/200 |
| 5,864,683 | 1/1999 | Boebert et al. | 395/200.79 |
| 5,892,904 | 4/1999 | Atkinson et al. | 713/201 |
| 5,956,481 | 9/1999 | Walsh et al. | 713/200 |
| 5,974,549 | 10/1999 | Golan | 713/200 |
| 5,983,348 | 11/1999 | Ji | 713/200 |

OTHER PUBLICATIONS

Web Page, Article "Frequently Asked Questions About Authenticode", Microsoft Corporation, last updated Feb. 17, 1997, URL: http://www.microsoft.com/workshop/security/authcode/signfaq.asp#9, pp. 1–13.

Web page: http://iel.ihs.com:80/cgi–bin/iel$_{13}$ cgi?se...2ehts%26ViewTemplate%3ddocview%5fb%2ehts, Okamato, E. et al., "ID–Based Authentication System For Computer Virus Detection", IEEE/IEE Electronic Library online, Electronics Letters, vol. 26, Issue 15, ISSN 0013–5194, Jul. 19, 1990, Abstract and pp. 1169–1170.

"Finjan Announces a Personal Java™ Firewall for Web Browsers—the SurfinShield™ 1.6", Press Release of Finjan Releases SurfinShield, Oct. 21, 1996, 2 pages.

"Finjan Software Releases SurfinBoard, Industry's First JAVA Security Product For the World Wide Web", Article published on the Internet by Finjan Software, Ltd., Jul. 29, 1996, 1 page.

"Powerful PC Security for the New World of Java™ and Downloadables, Surfin Shield™" Article published on the Internet by Finjan Software Ltd., 1996, 2 pages.

"Company Profile Finjan—Safe Surfing, The Java Security solutions Provider" Article published on the Internet by Finjan Software Ltd., Oct. 31, 1996, 3 pages.

"Finjan Announces Major Power Boost and New Features for SurfinShield™ 2.0" Las Vegas Convention Center/Pavillion 5 P5551, Nov. 18, 1996, 3 pages.

"Java Security: Issues & Solutions" Article published on the Internet by Finjan Software Ltd., 1996, 8 pages.

"Products" Article published on the Internet, 7 pages.

Mark LaDue, "Online Business Consultant" Article published on the Internet, Home Page, Inc. 1996, 4 pages.

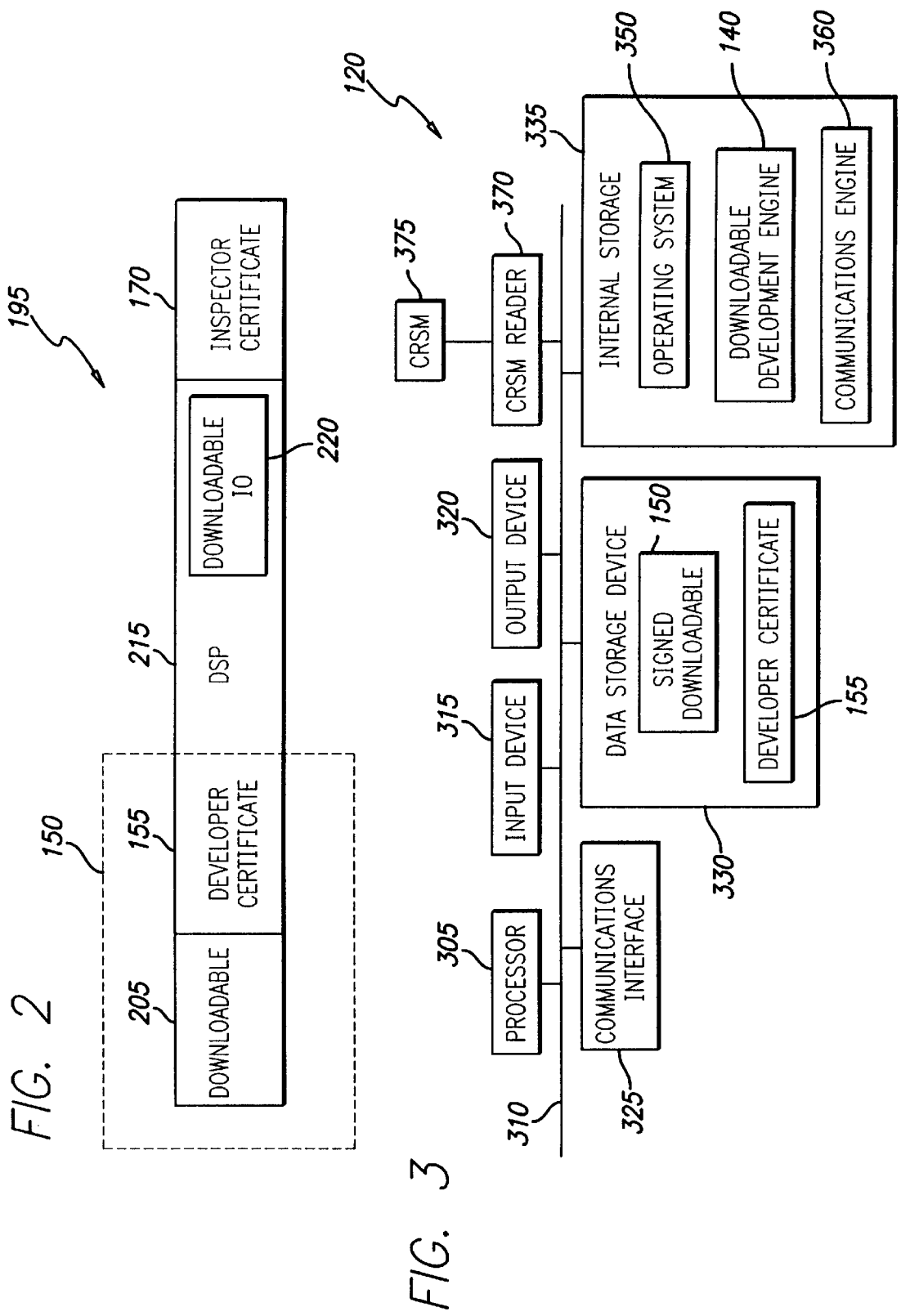

SYSTEM AND METHOD FOR ATTACHING A DOWNLOADABLE SECURITY PROFILE TO A DOWNLOADABLE

PRIORITY REFERENCE TO RELATED APPLICATIONS

This application claims benefit of and hereby incorporates by reference provisional application Ser. No. 60/030,639, entitled "System and Method for Protecting a Computer from Hostile Downloadables," filed on Nov. 8, 1996, by inventor Shlomo Touboul; patent application Ser. No. 08/964,388, entitled "System and Method for Protecting a Computer and a Network from Hostile Downloadables," filed on Nov. 6, 1997, by inventor Shlomo Touboul; and patent application Ser. No. 08/790,097, entitled "System and Method for Protecting a Client from Hostile Downloadables," filed on Jan. 29, 1997, also by inventor Shlomo Touboul.

BACKGROUND OF THE INVENTION

1. Field of the Invention

This invention relates generally to computer networks, and more particularly provides a system and method for attaching a Downloadable security profile to a Downloadable to facilitate the protection of computers and networks from a hostile Downloadable.

2. Description of the Background Art

The Internet is currently a collection of over 100,000 individual computer networks owned by governments, universities, nonprofit groups and companies, and is expanding at an accelerating rate. Because the Internet is public, the Internet has become a major source of many system damaging and system fatal application programs, commonly referred to as "viruses."

Accordingly, programmers continue to design computer and computer network security systems for blocking these viruses from attacking both individual and network computers. On the most part, these security systems have been relatively successful. However, these security systems are not configured to recognize computer viruses which have been attached to or configured as Downloadable application programs, commonly referred to as "Downloadables." A Downloadable is an executable application program, which is downloaded from a source computer and run on the destination computer. A Downloadable is typically requested by an ongoing process such as by an Internet browser or web client. Examples of Downloadables include Java™ applets designed for use in the Java™ distributing environment developed by Sun Microsystems, Inc., JavaScript™ scripts also developed by Sun Microsystems, Inc., ActiveX™ controls designed for use in the ActiveX™ distributing environment developed by the Microsoft Corporation, and Visual Basic also developed by the Microsoft Corporation. Downloadables may also include plugins, which add to the functionality of an already existing application program. Therefore, a system and method are needed to protect a network from hostile Downloadables.

SUMMARY OF THE INVENTION

The present invention provides systems for protecting a network from suspicious Downloadables, e.g., Java™ applets, ActiveX™ controls, JavaScript™ scripts, or Visual Basic scripts. The network system includes an inspector for linking Downloadable security profiles to a Downloadable, and a protection engine for examining the Downloadable and Downloadable security profiles to determine whether or not to trust the Downloadable security profiles.

The inspector includes a content inspection engine that uses a set of rules to generate a Downloadable security profile corresponding to a Downloadable. The content inspection engine links the Downloadable security profile to the Downloadable. The set of rules may include a list of suspicious operations, or a list of suspicious code patterns. The first content inspection engine may link to the Downloadable a certificate that identifies the content inspection engine which created the Downloadable security profile. The system may include additional content inspection engines for generating and linking additional Downloadable security profiles to the Downloadable. Each additional Downloadable security profile may also include a certificate that identifies its creating content inspection engine. Each content inspection engine may create a Downloadable ID that identifies the Downloadable to which the Downloadable security profile corresponds.

The protection engine includes a Downloadable interceptor for receiving a Downloadable, a file reader coupled to the interceptor for determining whether the Downloadable includes a Downloadable security profile, an engine coupled to the file reader for determining whether to trust the Downloadable security profile, and a security policy analysis engine coupled to the verification engine for comparing the Downloadable security profile against a security policy if the engine determines that the Downloadable security profile is trustworthy. The engine preferably determines whether the first Downloadable security profile corresponds to the Downloadable. The system preferably includes a Downloadable ID verification engine for retrieving a Downloadable ID that identifies the Downloadable to which the Downloadable security profile corresponds. To confirm the correspondence between the Downloadable security profile and the Downloadable, the Downloadable ID verification engine generates the Downloadable ID for the Downloadable and compares the generated Downloadable to the linked Downloadable. The system may also include a content inspection engine for generating a Downloadable security profile for the Downloadable if the first Downloadable security profile is not trustworthy. The system further includes a certificate authenticator for authenticating a certificate that identifies a content inspection engine which created the Downloadable security profile as from a trusted source. The certificate authenticator can also authenticate a certificate that identifies a developer that created the Downloadable.

The present invention provides a method in a first embodiment comprising the steps of receiving a Downloadable, generating a first Downloadable security profile for the received Downloadable, and linking the first Downloadable security profile to the Downloadable. The present invention further provides a method in a second embodiment comprising the steps of receiving a Downloadable with a linked first Downloadable security profile, determining whether to trust the first Downloadable security profile, and comparing the first Downloadable security profile against the security policy if the first Downloadable security profile is trustworthy It will be appreciated that the system and method of the present invention may provide computer protection from known hostile Downloadables. The system and method of the present invention may identify Downloadables that perform operations deemed suspicious. The system and method of the present invention may examine the Downloadable code to determine whether the code contains any suspicious operations, and thus may allow or block the Downloadable accordingly. It will be appreciated that, because the system and method of the present invention link a verifiable Downloadable security profile to a Downloadable, the system and method may avoid decomposing the Downloadable into the Downloadable security profile on the fly.

BRIEF DESCRIPTION OF THE DRAWINGS

FIG. 2 is a block diagram illustrating details of an example inspected Downloadable of FIG. 1;

FIG. 3 is a block diagram illustrating details of a developer of FIG. 1;

DETAILED DESCRIPTION OF THE PREFERRED EMBODIMENT

Figure 1:
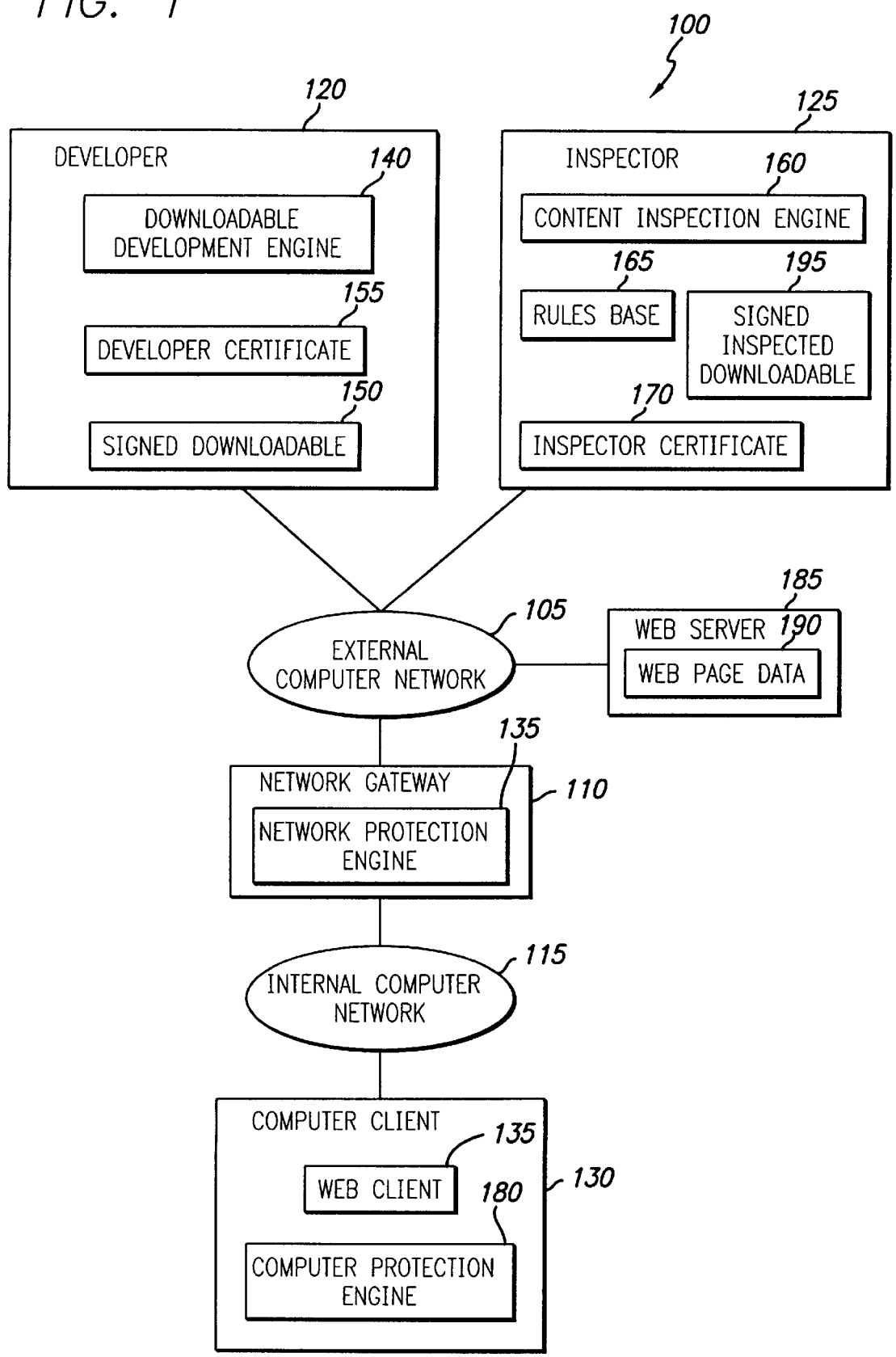
FIG. 1 is a block diagram illustrating a network system in accordance with the present invention.

FIG. 1 is a block diagram illustrating a computer network system 100 in accordance with the present invention. The computer network system 100 includes an external computer network 105, such as the Wide Area Network (WAN) commonly referred to as the Internet, coupled via a network gateway 110 to an internal computer network 115, such as a Local Area Network (LAN) commonly referred to as an intranet. The network system 100 further includes a developer 120 coupled to the external computer network 105, an inspector 125 also coupled to the external computer network 105, a web server 185 also coupled to the external computer network 105, and a computer client 130 coupled to the internal computer network 115. One skilled in the art will recognize that connections to external or internal network systems are merely exemplary, and alternative embodiments may have other connections. Further, although the developer 120, inspector 125 and web server 185 are being described as distinct sites, one skilled in the art will recognize that these elements may be a part of an integral site, may each include components of multiple sites, or may include combinations of single and multiple sites.

The developer 120 includes a Downloadable development engine 140 for generating a signed (yet uninspected) Downloadables 150. The developer 120 may obtain an uninspected Downloadable or may initially use the Downloadable development engine 140 to generate an uninspected Downloadable. The developer 120 can then use the Downloadable development engine 140 to transmit the signed Downloadable to the inspector 125 for hostility inspection. The developer 120 includes a developer certificate 155, which the Downloadable development engine 140 attaches to each uninspected Downloadable so that the inspector 125, the network gateway 110 and the computer client 130 can authenticate the developer 120.

The inspector 125 includes a content inspection engine 160 for examining a received Downloadable, e.g., the signed Downloadable 150 received from the developer 120, for generating a Downloadable Security Profile (DSP) based on a rules base 165 for the Downloadable, and for attaching the DSP to the Downloadable. A DSP preferably includes a list of all potentially hostile or suspicious computer operations that may be attempted by the Downloadable, and may also include the respective arguments of these operations. Generating a DSP includes searching the Downloadable code for any pattern, which is undesirable or suggests that the code was written by a hacker. The content inspection engine 160 preferably performs a fall-content inspection. It will be appreciated that generating a DSP may also include comparing a Downloadable against Downloadables which Original Equipment Manufacturers (OEMs) know to be hostile, Downloadables which OEMs know to be non-hostile, and Downloadables previously examined by the content inspection engine 160. Accordingly, the rules base may include a list of operations and code patterns deemed suspicious, known hostile Downloadables, known viruses, etc.

An Example List of Operations Deemed Suspicious

File operations: READ a file, WRITE a file, DELETE a file, RENAME a file;

Network operations: LISTEN on a socket, CONNECT to a socket, SEND data, RECEIVE data, VIEW INTRANET;

Registry operations: READ a registry item, WRITE a registry item;

Operating system operations: EXIT WINDOWS, EXIT BROWSER, START PROCESS/THREAD, KILL PROCESS/THREAD, CHANGE PROCESS/THREAD PRIORITY, DYNAMICALLY LOAD A CLASS/LIBRARY, etc.; and Resource usage thresholds: memory, CPU, graphics, etc.

Figure 5:
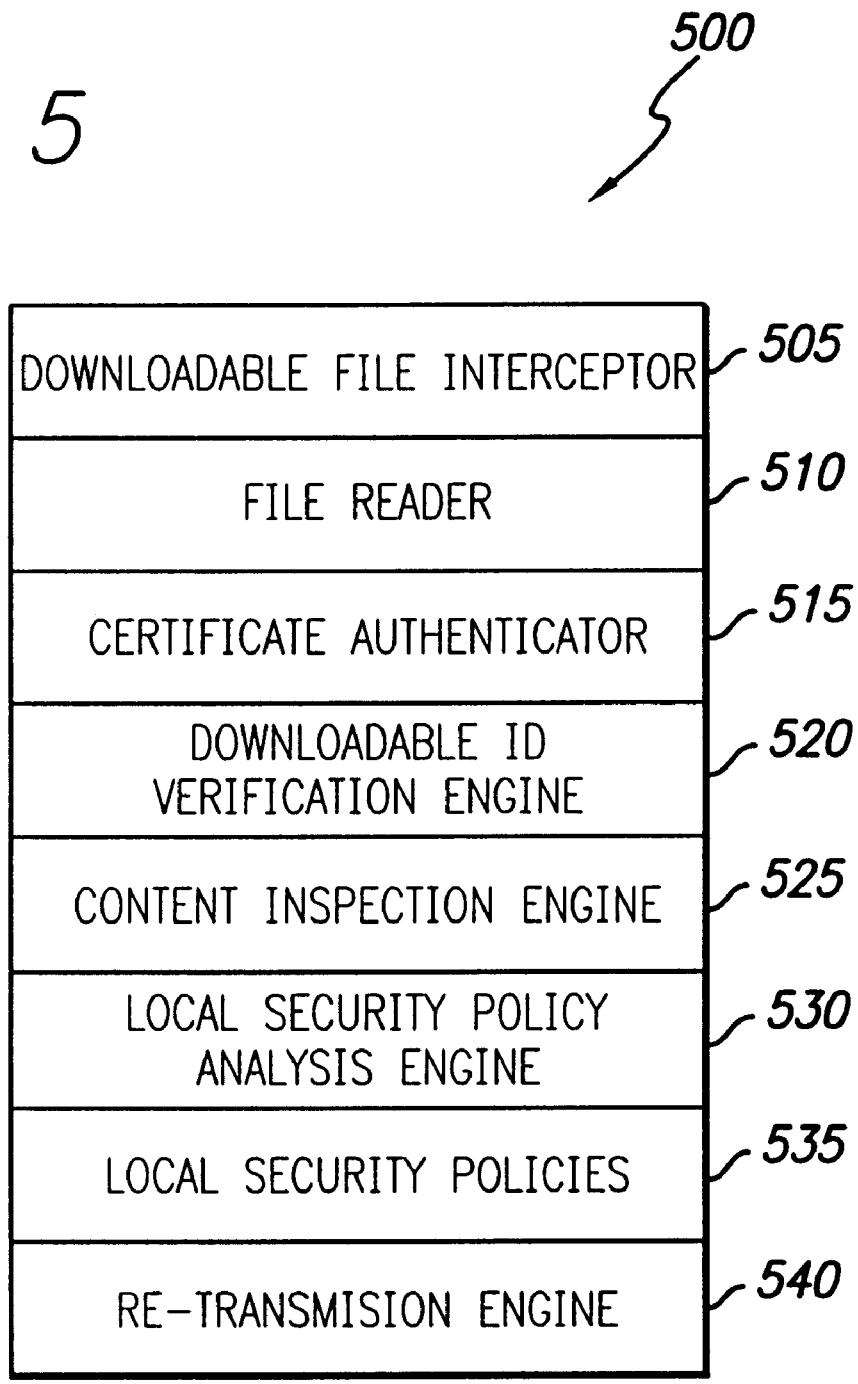
FIG. 5 is a block diagram illustrating details of a generic protection engine of FIG. 1.

Further, the content inspection engine 160 generates and attaches a Downloadable ID to the Downloadable. The Downloadable ID is typically stored as part of the DSP, since multiple DSPs may be attached to a Downloadable and each may have a different Downloadable ID. Preferably, to generate a Downloadable ID, the content inspection engine 160 computes a digital hash of the complete Downloadable code. The content inspection engine 160 preferably prefetches all components embodied in or identified by the code for Downloadable ID generation. For example, the content inspection engine 160 may prefetch all classes embodied in or identified by the Java™ applet bytecode, and then may perform a predetermined digital hash on the Downloadable code (and the retrieved components) to generate the Downloadable ID. Similarly, the content inspection engine 160 may retrieve all components listed in the .INF file for an ActiveX™ control to compute a Downloadable ID. Accordingly, the Downloadable ID for the Downloadable will be the same each time the content inspection engine 160 (or a protection engine as illustrated in FIG. 5) receives the same Downloadable and applies the same digital hash function. The downloadable components need not be stored with the Downloadable, but can be retrieved before each use or Downloadable ID generation.

Generating a DSP and generating a Downloadable ID are described in great detail with reference to the patent application Ser. No. 08/964,388, entitled "System and Method for Protecting a Computer and a Network from Hostile Downloadables," filed on Nov. 6, 1997, by inventor Shlomo Touboul, which has been incorporated by reference above.

After performing content inspection, the inspector 125 attaches an inspector certificate 170 to the Downloadable. The inspector certificate 170 verifies the authenticity of the DSP attached to the Downloadable. Details of an example signed inspected Downloadable 150 are illustrated and described with reference to FIG. 2. The inspector 125 then transmits the signed inspected Downloadable 195 to the web server 185 for addition to web page data 190 and web page deployment. Accordingly, the computer client 130 includes a web client 175 for accessing the web page data 190 provided by the web server 185. As is known in the art, upon recognition of a Downloadable call, the web client 175 requests the web server 185 to forward the corresponding Downloadable. The web server 185 then transmits the Downloadable via the network gateway 110 to the computer client 130.

The network gateway 110 includes network protection engine 135, and the computer client 130 includes a computer protection engine 180. Both the network protection engine 135 and the computer protection engine 180 examine all incoming Downloadables and stop all Downloadables deemed suspicious. It will be appreciated that a Downloadable is deemed suspicious if it performs or may perform any undesirable operation, or if it threatens or may threaten the integrity of any computer component. It is to be understood that the term "suspicious" includes hostile, potentially hostile, undesirable, potentially undesirable, etc. Thus, if the incoming Downloadable includes a signed inspected Downloadable 195, then the network protection engine 135 and the computer protection engine 180 can review the attached certificates to verify the authenticity of the DSP. If the incoming Downloadable does not include a signed inspected Downloadable 195, then each of the network protection engine 135 and the computer protection engine 180 must generate the DSP, and compare the DSP against local security policies (535, FIG. 5).

Components and operation of the network protection engine 135 and the computer protection engine 180 are described in greater detail with reference to FIG. 5. It will be appreciated that the network gateway 110 may include the components described in the patent-application Ser. No. 08/964,388, entitled "System and Method for Protecting a Computer and a Network from Hostile Downloadables," filed on Nov. 6, 1997, by inventor Shlomo Touboul, which has been incorporated by reference above. It will be further appreciated that the computer protection engine 180 may include the components described in the patent application Ser. No. 08/790,097, entitled "System and Method for Protecting a Client from Hostile Downloadables," filed on Jan. 29, 1997, also by inventor Shlomo Touboul.

It will be appreciated that the network system 100 may include multiple inspectors 125, wherein each inspector 125 may provide a different content inspection. For example, one inspector 125 may examine for suspicious operations, another inspector 125 may examine for known viruses that may be attached to the Downloadable 150, etc. Each inspector 125 would attach a corresponding DSP and a certificate verifying the authenticity of the attached DSP. Alternatively, a single inspector 125 may include multiple content inspection engines 160, wherein each engine provides a different content inspection.

FIG. 2 is a block diagram illustrating details of a signed inspected Downloadable 195, which includes a Downloadable 205, a developer certificate 155, a DSP 215 which includes a Downloadable ID 220, and an inspector certificate 170. The Downloadable 205 includes the downloadable and executable code that a web client 175 receives and executes. The Downloadable 205 may be encrypted using the developer's private key. The attached developer certificate 155 may include the developer's public key, the developer's name, an expiration date of the key, the name of the certifying authority that issued the certificate, and a serial number. The signed Downloadable 150 comprises the Downloadable 205 and the developer certificate 155. The DSP 215 and Downloadable ID 220 may be encrypted by the inspector's private key. The Downloadable ID 220 is illustrated as part of the DSP 215 for simplicity, since each signed inspected Downloadable 195 may include multiple DSPs 215 (and each DSP 215 may include a separate and distinct Downloadable ID 220). The inspector certificate 170 may include the inspector's public key, an expiration date of the key, the name of the certifying authority that issued the certificate, and a Ser. No.

Although the signed inspected Downloadable 195 illustrates the DSP 215 (and Downloadable ID 220) as an attachment, one skilled in the art will recognize that the DSP 215 can be linked to the Downloadable 205 using other techniques. For example, the DSP 215 can be stored in the network system 100, and alternatively a pointer to the DSP 215 can be attached to the signed inspected Downloadable 195. The term "linking" herein will be used to indicate an association between the Downloadable 205 and the DSP 215 (including using a pointer from the Downloadable 195 to the DSP 215, attaching the DSP 215 to the Downloadable 205, etc.)

FIG. 3 is a block diagram illustrating details of the developer 120, which includes a processor 305, such as an Intel Pentium® microprocessor or a Motorola Power PC® microprocessor, coupled to a signal bus 310. The developer 120 further includes an input device 315 such as a keyboard and mouse, an output device 320 such as a Cathode Ray Tube (CRT) display, a data storage device 330 such as a magnetic disk, and an internal storage 335 such as Random-Access Memory (RAM), each coupled to the signal bus 310. A communications interface 325 couples the signal bus 325 to the external computer network 105, as shown in FIG. 1.

An operating system 350 controls processing by processor 305, and is typically stored in the data storage device 330 and loaded into internal storage 335 (as illustrated) for execution by processor 305. The Downloadable development engine 140 generates signed Downloadables 150 as described above, and also may be stored in the data storage device 330 and loaded into internal storage 335 (as illustrated) for execution by processor 305. The data storage device 330 stores the signed Downloadables 150 and the developer certificate 155. A communications engine 360 controls communications via the communications interface 325 with the external computer network 105, and also may be stored in the data storage device 330 and loaded into internal storage 335 (as illustrated) for execution by processor 305.

One skilled in the art will understand that the developer 120 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 370 such as a magnetic disk drive, hard disk drive, magneto-optical reader, CPU, etc. may be coupled to the signal bus 310 for reading a computer-readable storage medium (CRSM) 375 such as a magnetic disk, a hard disk, a magneto-optical disk, RAM, etc. Accordingly, the developer 120 may receive programs and data via the CRSM reader 370.

Figure 4:
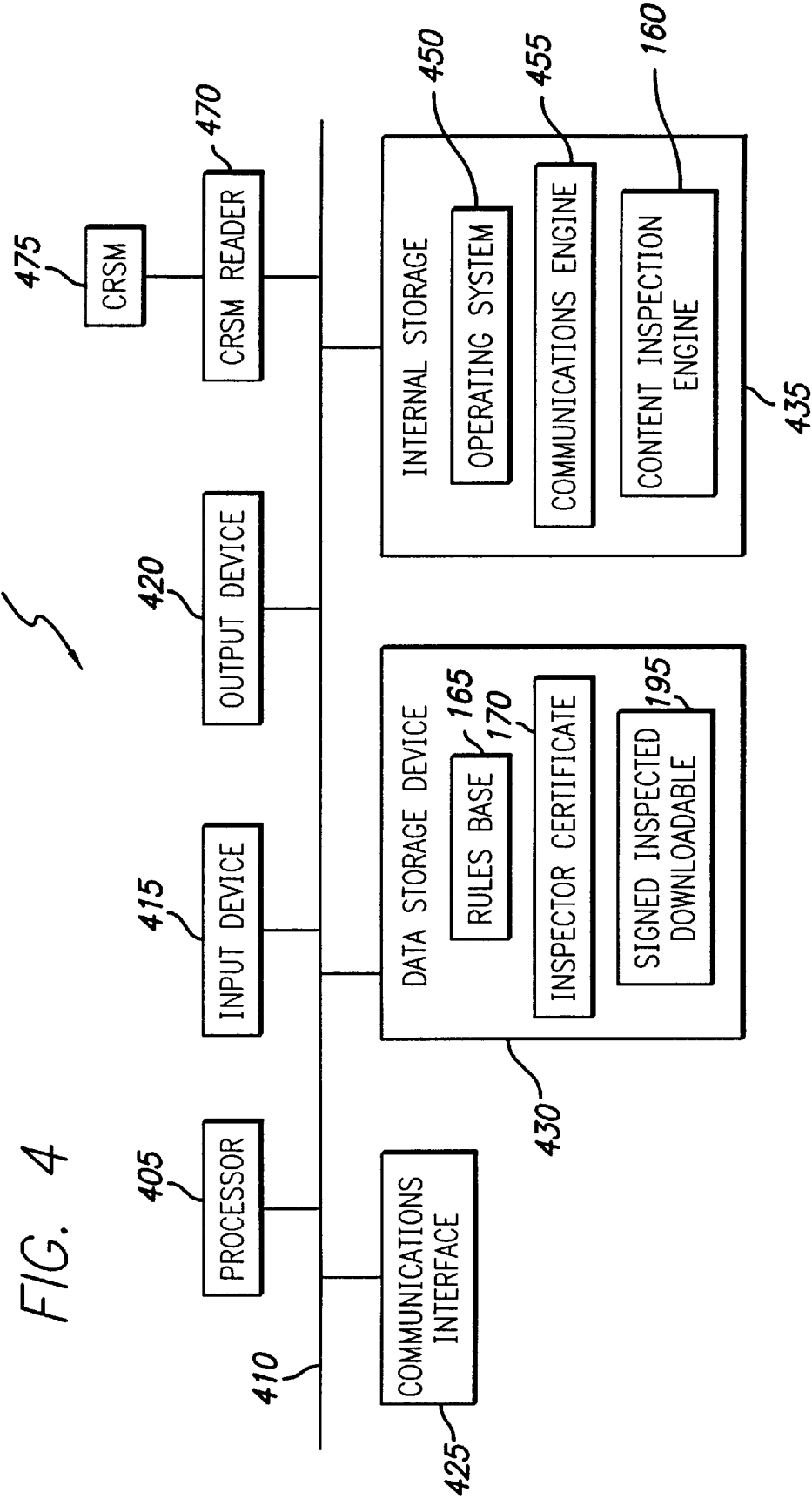
FIG. 4 is a block diagram illustrating details of an inspector of FIG. 1.

FIG. 4 is a block diagram illustrating details of the inspector 125, which includes a processor 405, such as an Intel Pentium® microprocessor or a Motorola Power PC® microprocessor, coupled to a signal bus 410. The inspector 125 further includes an input device 415 such as a keyboard and mouse, an output device 420 such as a CRT display, a data storage device 430 such as a magnetic disk, and an internal storage 435 such as RAM, each coupled to the signal bus 410. A communications interface 425 couples the signal bus 425 to the external computer network 105, as shown in FIG. 1.

An operating system 450 controls processing by processor 405, and is typically stored in the data storage device 430 and loaded into internal storage 435 (as illustrated) for execution by processor 405. The content inspection engine 160 performs a content inspection of Downloadables from the developer 120 and attaches the results of the content inspection. The content inspection engine 160 also may be stored in the data storage device 330 and loaded into internal storage 335 (as illustrated) for execution by processor 405. The data storage device 330 stores the rules base 165, the inspector certificate 170 and the signed inspected Downloadable 195. A communications engine 455 controls communications via the communications interface 425 with the external computer network 105, and also may be stored in the data storage device 430 and loaded into internal storage 435 (as illustrated) for execution by processor 405.

One skilled in the art will understand that the inspector 125 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 470 such as a magnetic disk drive, hard disk drive, magneto-optical reader, processor, etc. may be coupled to the signal bus 410 for reading a computer-readable storage medium (CRSM) 475 such as a magnetic disk, a hard disk, a magneto-optical disk, RAM, etc. Accordingly, the inspector 125 may receive programs and data via the CRSM reader 470.

FIG. 5 is a block diagram illustrating details of a generic protection engine 500, which exemplifies each of the network protection engine 135 and the computer protection engine 180. The generic protection engine 500 includes a Downloadable file interceptor 505 for intercepting incoming Downloadables (i.e., Downloadable files) for inspection, and a file reader 510 for opening the received Downloadable file and initiating appropriate components.

If the enclosed Downloadable includes a signed inspected Downloadable 195, the file reader 510 initiates execution of a certificate authenticator 515. The certificate authenticator 515 verifies the authenticity of the developer certificate 155 and the authenticity of the inspector certificate 170. One skilled in the art will appreciate that certificate verification may include using authenticated or known public keys to decrypt the certificates or the enclosed files. A Downloadable ID verification engine 520 regenerates the Downloadable ID for the enclosed Downloadable 150, and compares the regenerated Downloadable ID against the enclosed Downloadable ID 220. If the received Downloadable fails any of the above tests (or if the received Downloadable is not a signed inspected Downloadable 195), then a local content inspection engine 525 generates a DSP for the enclosed Downloadable 205. Otherwise, if the received Downloadable file passes all of the above tests, then the content inspection engine 525 trusts the attached DSP 215 and thus need not generate a DSP. The content inspection engine 525 is similar to the content inspection engine 160 of the inspector 125. One skilled in the art will recognize that the generic protection engine 500 may include multiple content inspection engines 525 for performing distinct content examinations.

A local security policy analysis engine 530 compares the attached or generated DSP against local security policies 535. The local security policies 535 may include a list of specific Downloadables to block, a list of specific Downloadables to allow, generic rules to apply regardless of the intended recipient and recipient's status, specific rules to apply based on the intended recipient or the intended recipient's status, trusted certificates, etc. If the received Downloadable passes all the local security policies 535, a retransmission engine 540 passes the Downloadable onward to the intended recipient for execution.

It will be appreciated that components of the generic protection engine 500 may include components described in the patent applications incorporated by reference above. For example, the local security policies 535 in this application may include the security policies 305 of the patent application Ser. No. 08/964,388, entitled "System and Method for Protecting a Computer or a Network from Hostile Downloadables," filed on Nov. 6, 1997, by inventor Shlomo Touboul; the content inspection engine 525 and the content inspection engine 160 each may include the code scanner 325 of the same patent application; the certificate authenticator 515 may include the certificate scanner 340 and the certificate comparator 345 of the same patent application, the local security policy analysis engine 530 may include the access control lists comparator 330 and the logical engine 333 of the same patent; the Downloadable ID verification engine 520 may include the ID generator 315 of the same patent application; and the file reader 510 may include the first comparator 320 of the same patent application.

Figure 6:
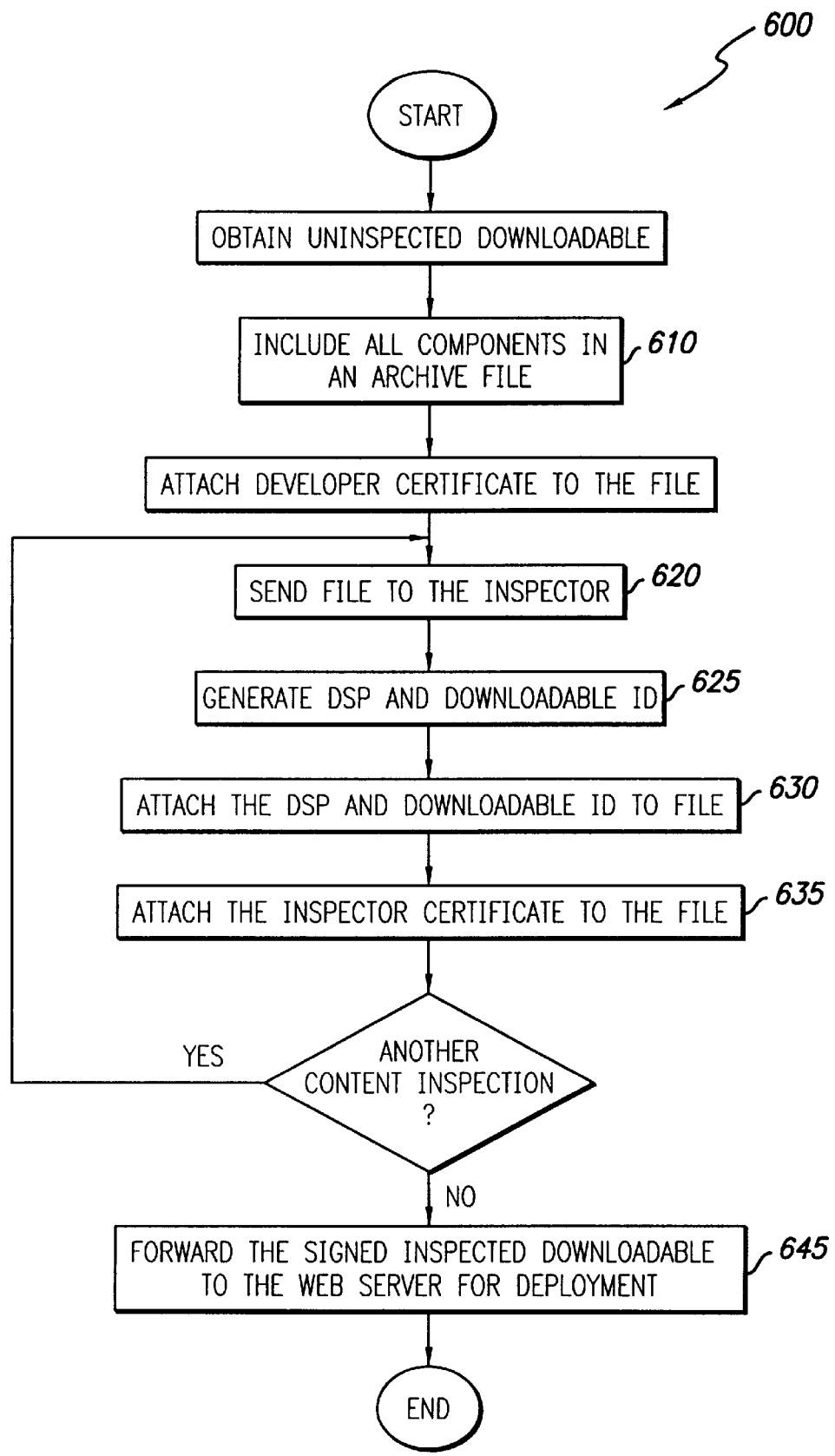
FIG. 6 is a flowchart illustrating a method for attaching a Downloadable security profile to a Downloadable in accordance with the present invention.

FIG. 6 is a flowchart illustrating a method 600 for inspecting a Downloadable 205 in accordance with the present invention. Method 600 begins with the developer 120 in step 605 obtaining or using the Downloadable development engine 140 to create a Downloadable 205. The Downloadable development engine 140 in step 610 includes all components, e.g., all Java™ classes for a Java™ applet, into a Downloadable archive file, and in step 615 attaches the developer certificate 155 to the archive file, thereby creating a signed Downloadable 150.

The Downloadable development engine 140 in step 620 transmits the signed Downloadable 150 to the inspector 125. The content inspection engine 160 in step 625 generates a DSP 215 and a Downloadable ID 220 for the Downloadable 150. As stated above, generating a DSP includes examining the Downloadable 205 (and the Downloadable components) for all suspicious operations that will or may be performed by the Downloadable, all suspicious code patterns, all known viruses, etc. Generating a DSP may include comparing all operations that will or may be performed against a list of suspicious operations or against a list of rules, e.g., a rules base 165. Accordingly, if an operation in the Downloadable 205 matches one of the suspicious operations or violates one of the rules, then the operation is listed in the DSP 215. Generating a Downloadable ID 220 includes computing a digital hash of the Downloadable 205 (and the Downloadable components), so that the Downloadable ID is identical for each instance of the same Downloadable 205.

The content inspection engine 160 in step 630 attaches the DSP 215 and the Downloadable ID 220 to the Downloadable archive file, i.e., to the signed Downloadable 150. The content inspection engine 160 in step 635 attaches the inspector certificate 170 to the file, thereby providing authentication of the attached DSP 215 (including the Downloadable ID 220).

The inspector 125 in step 640 determines whether another content inspection is to be effected. If so, then method 600 returns to step 600 to send the file to the next inspector 620. One skilled in the art will recognize that the same inspector 125 may be used to perform another content inspection, attachment of another DSP 215 and Downloadable ID 220 and attachment of another inspector certificate 170. If the inspector 125 determines in step 640 that no more content inspection is to be effected, then the inspector 125 forwards the signed inspected Downloadable 195 to the web server 185 for addition to web page data 190 and web engine deployment. Accordingly, the web client 175 can access the web page data 190, and thus can retrieve the signed inspected Downloadable 195. Method 600 then ends.

Figure 7:
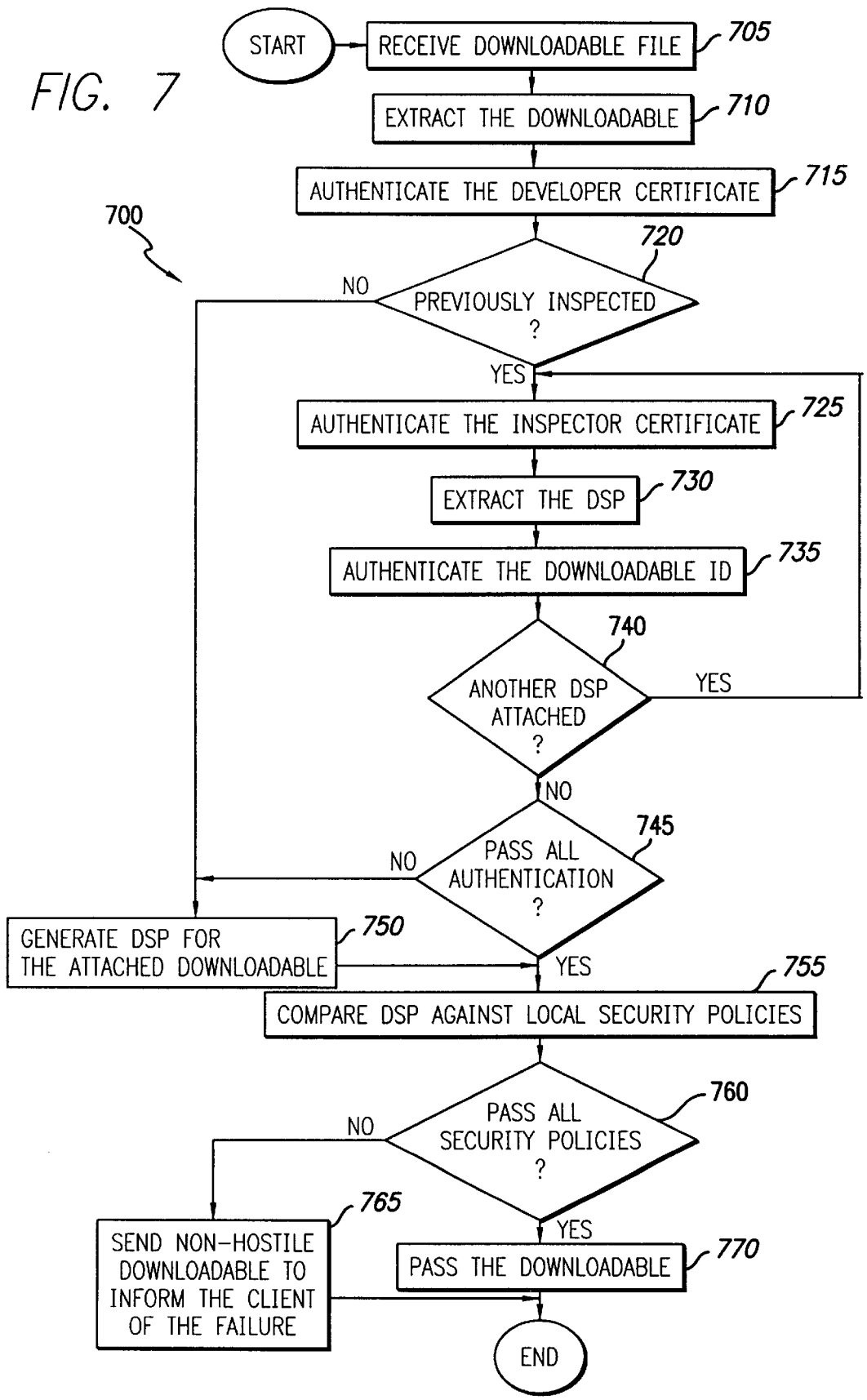
FIG. 7 is a flowchart illustrating a method for examining a Downloadable in accordance with the present invention.

FIG. 7 is a flowchart illustrating a method 700 for examining a Downloadable (whether or not signed and inspected). Method 700 begins with the Downloadable file interceptor 505 in step 705 receiving a Downloadable file. The file reader 510 in step 710 extracts the Downloadable 150, and in step 715 instructs the certificate authenticator 515 to authenticate the developer certificate 155 as from a trusted developer 120. Developer certificate authentication may include retrieving the public key for the developer 120 from a trusted source, and using the public key to decrypt the Downloadable 205.

The file reader 510 in step 720 determines whether an inspector 125 has previously inspected the received Downloadable. If the received Downloadable has not been inspected, then method 700 jumps to step 750. Otherwise, the file reader 510 initiates the certificate authenticator 515 in step 725 to authenticate the inspector certificate 170 as from a trusted inspector 125. Inspector certificate authentication may include retrieving the public key for the inspector 125 from a trusted source, and using the public key to decrypt the attached DSP 215 (including the Downloadable ID 220). The file reader 510 in step 730 extracts the DSP 215 (including the Downloadable ID 220), and in step 735 instructs the Downloadable ID verification engine 520 to authenticate the Downloadable ID 220. That is, the Downloadable ID verification engine 520 performs the same digital hash on the Downloadable 205 (including all components) to regenerate the Downloadable ID. If the components are not included in the file, then the Downloadable ID verification engine 520 may prefetch the components. Thus, if the regenerated Downloadable ID is the same as the attached Downloadable ID 220, then the Downloadable ID verification engine 520 verifies that the attached DSP 215 corresponds to the attached Downloadable 205.

The file reader 510 in step 740 determines whether another DSP 215 is attached to the file. If so, then method 700 returns to step 725. Otherwise, the content inspection engine 525 in step 745 determines whether the Downloadable 205 passed or failed any of the authentication tests above. If the Downloadable 205 failed any of the steps (or if as stated above the received Downloadable did not include a signed inspected Downloadable 195), then method 700 jumps to step 750.

The content inspection engine 525 in step 750 generates a DSP (or DSPs) for the received Downloadable as described above with reference to FIGS. 1–6. Otherwise, if the Downloadable 205 passed all the steps, then the content inspection engine 525 indicates that the DSP 215 (or DSPs 215) attached to the received Downloadable may be trusted. The local security policy analysis engine 530 in step 755 compares the DSP 215 (or DSPs 215), whether generated on the fly or extracted from the file, against local security policies 535. As stated above, the local security policies 535 may include a rules base 165 that identifies suspicious operations, suspicious code patterns, known viruses, etc. One skilled in the art will appreciate that the security policies 535 may depend on the type of DSP 215. For example, the local security policy analysis engine 530 may compare a first attached DSP 215 against the list of suspicious operations and suspicious code patterns, and may compare a second attached DSP 215 against known viruses.

The content inspection engine 160 in step 760 determines whether each DSP 215 passes all corresponding security policies 535. If each DSP 215 passes, then the local security policy analysis engine 530 in step 770 instructs the retransmission engine 540 to pass the Downloadable. If a DSP 215 fails, then the local security policy analysis engine 530 in step 765 stops the Downloadable and sends a substitute non-hostile Downloadable to the computer client 130 to inform the computer client 130 of the failure. Method 700 then ends.

Figure 8:
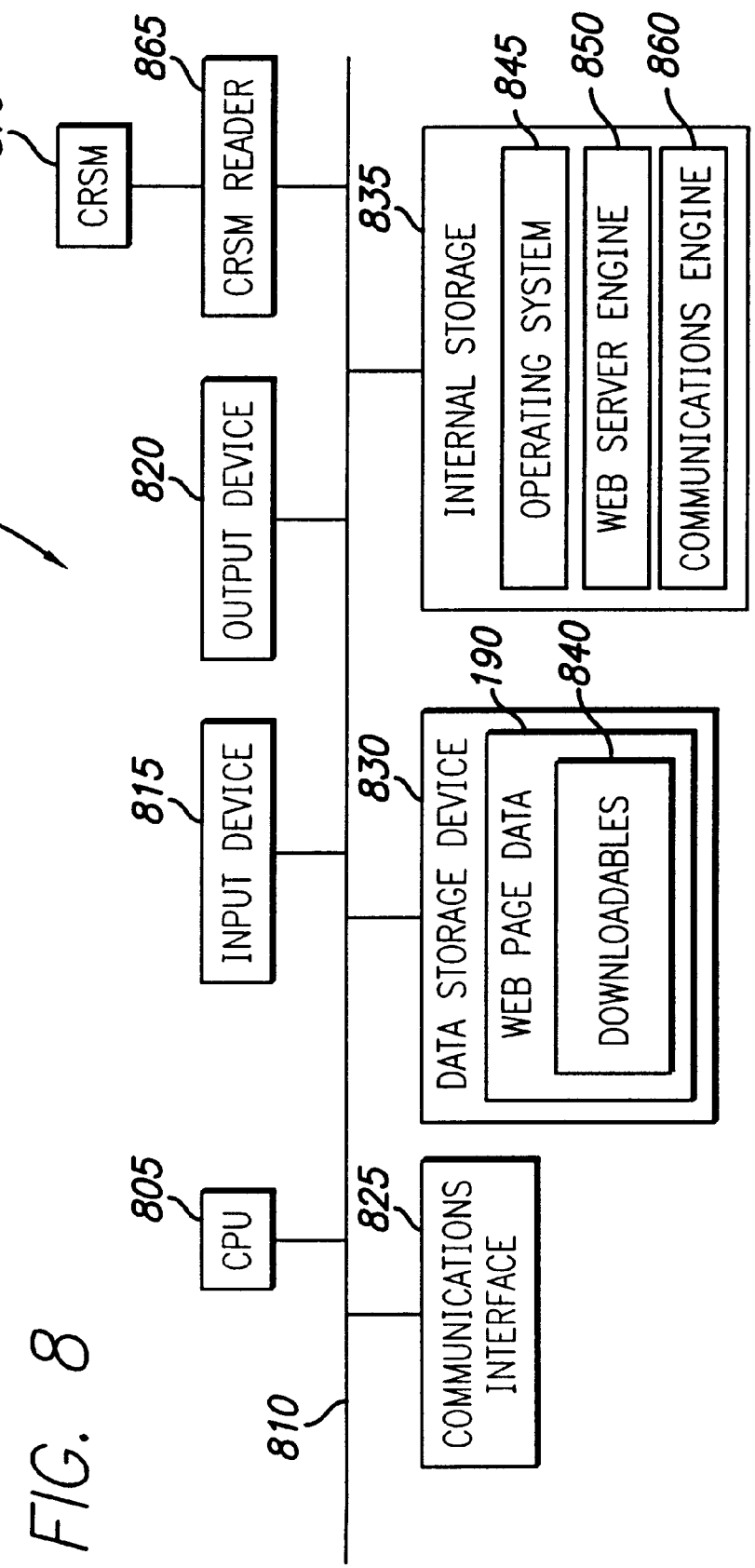
FIG. 8 is a block diagram illustrating details of the web server of FIG. 1.

FIG. 8 is a block diagram illustrating details of the web server 185, which includes a processor 805, such as an Intel Pentium® microprocessor or a Motorola Power PC® microprocessor, coupled to a signal bus 810. The web server 185 further includes an input device 815 such as a keyboard and mouse, an output device 820 such as a Cathode Ray Tube (CRT) display, a data storage device 830 such as a magnetic disk, and an internal storage 835 such as Random-Access Memory (RAM), each coupled to the signal bus 810. A communications interface 825 couples the signal bus 825 to the external computer network 105, as shown in FIG. 1.

An operating system 845 controls processing by processor 805, and is typically stored in the data storage device 830 and loaded into internal storage 835 (as illustrated) for execution by processor 805. A web server engine 850 controls web engine access to the web page data 190, and also may be stored in the data storage device 830 and loaded into internal storage 835 (as illustrated) for execution by processor 805. The data storage device 330 stores the web page data 190, which may include Downloadables 840 (whether or not signed and inspected). A communications engine 860 controls communications via the communications interface 825 with the external computer network 105, and also may be stored in the data storage device 830 and loaded into internal storage 835 (as illustrated) for execution by processor 805.

One skilled in the art will understand that the web server 185 may also include additional information, such as network connections, additional memory, additional processors, LANs, input/output lines for transferring information across a hardware channel, the Internet or an intranet, etc. One skilled in the art will also recognize that the programs and data may be received by and stored in the system in alternative ways. For example, a computer-readable storage medium (CRSM) reader 865 such as a magnetic disk drive, hard disk drive, magneto-optical reader, CPU, etc. may be coupled to the signal bus 310 for reading a computer-readable storage medium (CRSM) 870 such as a magnetic disk, a hard disk, a magneto-optical disk, RAM, etc. Accordingly, the web server 185 may receive programs and data via the CRSM reader 865.

The foregoing description of the preferred embodiments of the invention is by way of example only, and other variations of the above-described embodiments and methods are provided by the present invention. Components of this invention may be implemented using a programmed general purpose digital computer, using application specific integrated circuits, or using a network of interconnected conventional components and circuits. Connections may be wired, wireless, modem, etc. The embodiments described herein have been presented for purposes of illustration and are not intended to be exhaustive or limiting. Many variations and modifications are possible in light of the foregoing teaching. The system is limited only by the following claims.

What is claimed is:

1. A method comprising:

receiving by an inspector a Downloadable;

generating by the inspector a first Downloadable security profile that identifies suspicious code in the received Downloadable; and linking by the inspector the first Downloadable security profile to the Downloadable before a web server makes the Downloadable available to web clients.

2. The method of claim 1, wherein the first Downloadable security profile is linked to the Downloadable via attachment.

3. The method of claim 1, wherein the first Downloadable security profile is linked to the Downloadable via a pointer.

4. The method of claim 1, further comprising the step of linking to the first Downloadable security profile a Downloadable ID that identifies the Downloadable.

5. The method of claim 1, wherein the Downloadable includes a Java™ applet.

6. The method of claim 1, wherein the Downloadable includes an ActiveX™ control.

7. The method of claim 1, wherein the Downloadable includes a JavaScript™ script.

8. The method of claim 1, wherein the Downloadable includes a Visual Basic script.

9. The method of claim 1, further comprising the step of linking to the Downloadable a certificate that identifies the developer which created the Downloadable.

10. The method of claim 1, further comprising the step of linking to the Downloadable a certificate that identifies a first content inspection engine which generated the first Downloadable security profile.

11. The method of claim 1, wherein the first Downloadable security profile includes a list of operations deemed suspicious by the inspector.

12. The method of claim 1, further comprising the steps of generating a second Downloadable security profile, and linking the second Downloadable security profile to the received Downloadable.

13. The method of claim 12, further comprising the steps of linking a first certificate that identifies a first content inspection engine which generated the first Downloadable security profile, and linking an second certificate that identifies a second content inspection engine which generated the second Downloadable security profile.

14. The method of claim 13, wherein each of the first Downloadable security profile and the second Downloadable security profile includes a Downloadable ID identifying the received Downloadable.

15. An inspector system comprising:

memory storing a first rule set; and a first content inspection engine for using the first rule set to generate a first Downloadable security profile that identifies suspicious code in a Downloadable, and for linking the first Downloadable security profile to the Downloadable before a web server makes the Downloadable available to web clients.

16. The system of claim 15, wherein the first rule set includes a list of suspicious operations.

17. The system of claim 15, wherein the first rule set include a list of suspicious code patterns.

18. The system of claim 15, wherein the first content inspection engine links to the Downloadable a certificate that identifies the first content inspection engine which created the first Downloadable security profile.

19. The system of claim 15, further comprising a second content inspection engine for generating a second Downloadable security profile, and for linking the second Downloadable security profile to the Downloadable.

20. The system of claim 15, wherein the first content inspection engine links to the Downloadable a first certificate that identifies the first content inspection engine which created the first Downloadable security profile, and wherein the second content inspection engine links to the Downloadable a second certificate that identifies the second content inspection engine which created the second Downloadable security profile.

21. The system of claim 15, wherein the first content inspection engine creates a first Downloadable ID that identifies the Downloadable to which the first Downloadable security profile corresponds, and links the Downloadable ID to the Downloadable security profile.

22. A method performed by a network gateway comprising:

receiving a Downloadable with a linked Downloadable security profile that identifies suspicious code in the Downloadable, the Downloadable security profile being linked to the Downloadable before the web server make the Downloadable available to the web client; and comparing the Downloadable security profile against a security policy.

23. A method performed by a network gateway comprising:

receiving a Downloadable with a linked first Downloadable security profile that identifies suspicious code in the Downloadable, the Downloadable security profile being linked to the Downloadable before the web server make the Downloadable available to the web client:

determining whether to trust the first Downloadable security profile; and comparing the first Downloadable security profile against the security policy if the first Downloadable security profile is trustworthy.

24. The method of claim 23, wherein the step of determining includes determining whether the first Downloadable security profile corresponds to the Downloadable.

25. The method of claim 24, wherein a Downloadable ID that identifies the Downloadable to which the Downloadable security profile corresponds is linked to the Downloadable security profile, and wherein the step of determining includes retrieving the linked Downloadable ID.

26. The method of claim 25, further comprising the steps of generating the Downloadable ID for the Downloadable, and comparing the generated Downloadable to the linked Downloadable.

27. The method of claim 23, further comprising the step of generating a Downloadable security profile for the Downloadable if the first Downloadable security profile is not trustworthy.

28. The method of claim 23, wherein a certificate that identifies a content inspection engine which created the Downloadable security profile is linked to the Downloadable security profile, and wherein the step of determining includes retrieving the certificate.

29. The method of claim 28, wherein the step of determining further includes authenticating the certificate as from a trusted source.

30. The method of claim 23, wherein a certificate that identifies a developer that created the Downloadable is linked to the Downloadable, and wherein the step of determining includes retrieving the certificate.

31. The method of claim 30, wherein the step of determining further includes authenticating the certificate as from a trusted developer.

32. A network gateway system comprising:
   a Downloadable interceptor for receiving a Downloadable;
   a file reader coupled to the interceptor for determining whether the Downloadable includes a linked Downloadable security profile that identifies suspicious code in the Downloadable, wherein if the Downloadable includes a linked Downloadable security profile, the Downloadable was linked before the web server makes the Downloadable available to the web client;
   an engine coupled to the file reader for determining whether to trust the Downloadable security profile; and
   a security policy analysis engine coupled to a verification engine for comparing the Downloadable security profile against a security policy if the engine determines that the Downloadable security profile is trustworthy.

33. The system of claim 32, wherein the engine determines whether the first Downloadable security profile corresponds to the Downloadable.

34. The system of claim 33, wherein a Downloadable ID that identifies the Downloadable to which the Downloadable security profile corresponds is linked to the Downloadable security profile, and wherein the engine includes a Downloadable ID verification engine for retrieving the linked Downloadable ID.

35. The system of claim 34, wherein the Downloadable ID verification engine generates the Downloadable ID for the Downloadable and compares the generated Downloadable to the linked Downloadable.

36. The system of claim 32, further comprising a content inspection engine coupled to the engine for generating a Downloadable security profile for the Downloadable if the first Downloadable security profile is not trustworthy.

37. The system of claim 32, wherein a certificate that identifies a content inspection engine which created the Downloadable security profile is linked to the Downloadable security profile, and wherein the engine retrieves the certificate.

38. The system of claim 37, wherein the engine includes a certificate authenticator for authenticating the certificate as from a trusted source.

39. The system of claim 32, wherein a certificate that identifies a developer that created the Downloadable is linked to the Downloadable, and wherein the engine retrieves the certificate.

40. The system of claim 39, wherein the engine includes a certificate authenticator for authenticating the certificate as from a trusted developer.

41. A computer-readable storage medium storing program code for causing a data processing system on an inspector to perform the steps of:
   receiving a Downloadable;
   generating a first Downloadable security profile that identifies suspicious code in the received Downloadable; and
   linking the first Downloadable security profile to the Downloadable before a web server makes the Downloadable available to web clients.

42. A computer-readable storage medium storing program code for causing a data processing system on a network gateway to perform the steps of:
   receiving a Downloadable with a linked first Downloadable security profile that identifies suspicious code in the Downloadable, the Downloadable security profile being linked to the Downloadable before the web server make the Downloadable available to the web client:
   determining whether to trust the first Downloadable security profile; and
   comparing the first Downloadable security profile against the security policy if the first Downloadable security profile is trustworthy.

43. An inspector system comprising:
   means for receiving a Downloadable;
   means for generating a first Downloadable security profile that identifies suspicious code in the received Downloadable; and
   means for linking the first Downloadable security profile to the Downloadable before a web server makes the Downloadable available to web clients.

44. A network gateway system comprising:
   means for receiving a Downloadable with a linked first Downloadable security profile that identifies suspicious code in the Downloadable, the Downloadable security profile being linked to the Downloadable before the web server make the Downloadable available to the web client:
   means for determining whether to trust the first Downloadable security profile; and
   means for comparing the first Downloadable security profile against the security policy if the first Downloadable security profile is trustworthy.

* * * * *

UNITED STATES PATENT AND TRADEMARK OFFICE
CERTIFICATE OF CORRECTION

PATENT NO. : 6,154,844
DATED : November 28, 2000
INVENTOR(S) : Shlomo Touboul et al.

It is certified that error appears in the above-identified patent and that said Letters Patent is hereby corrected as shown below:

<u>Title page,</u>
Item [73], Assignee, Finjan Software, Ltd., San Jose, Calif., after "Finjan Software," change the words "Ltd., San Jose, Calif." to -- Ltd., Kefar Haim, Israel --

Signed and Sealed this

First Day of October, 2002

Attest:

Attesting Officer

JAMES E. ROGAN
*Director of the United States Patent and Trademark Office*

(12) EX PARTE REEXAMINATION CERTIFICATE (10863rd)

United States Patent
Touboul et al.

(10) Number: US 6,154,844 C1
(45) Certificate Issued: May 16, 2016

(54) SYSTEM AND METHOD FOR ATTACHING A DOWNLOADABLE SECURITY PROFILE TO A DOWNLOADABLE

(75) Inventors: Shloma Touboul, Kefar-Haim (IL); Nachshon Gal, Tel-Aviv (IL)

(73) Assignee: FINJAN, INC., East Palo Alto, CA (US)

Reexamination Request:
No. 90/013,653, Dec. 9, 2015

Reexamination Certificate for:
Patent No.: 6,154,844
Issued: Nov. 28, 2000
Appl. No.: 08/995,648
Filed: Dec. 22, 1997

Certificate of Correction issued Oct. 1, 2002

Related U.S. Application Data

(60) Provisional application No. 60/030,639, filed on Nov. 8, 1996.

(51) Int. Cl.

| | |
|---|---|
| *G06F 1/00* | (2006.01) |
| *G06F 21/00* | (2013.01) |
| *H04L 29/06* | (2006.01) |
| *G06F 21/51* | (2013.01) |
| *G06F 21/53* | (2013.01) |
| *G06F 21/54* | (2013.01) |

(52) U.S. Cl.
CPC ............... *G06F 21/51* (2013.01); *G06F 21/53* (2013.01); *G06F 21/54* (2013.01); *H04L 29/06* (2013.01); *H04L 63/102* (2013.01); *H04L 63/145* (2013.01); *H04L 63/168* (2013.01); *G06F 2211/009* (2013.01); *G06F 2221/033* (2013.01); *G06F 2221/2115* (2013.01); *G06F 2221/2141* (2013.01)

(58) Field of Classification Search
None
See application file for complete search history.

(56) References Cited

To view the complete listing of prior art documents cited during the proceeding for Reexamination Control Number 90/013,653, please refer to the USPTO's public Patent Application Information Retrieval (PAIR) system under the Display References tab.

*Primary Examiner* — Christopher E Lee

(57) ABSTRACT

A system comprises an inspector and a protection engine. The inspector includes a content inspection engine that uses a set of rules to generate a Downloadable security profile corresponding to a Downloadable, e.g., Java™ applets, ActiveX™ controls, JavaScript™ scripts, or Visual Basic scripts. The content inspection engine links the Downloadable security profile to the Downloadable. The set of rules may include a list of suspicious operations, or a list of suspicious code patterns. The first content inspection engine may link to the Downloadable a certificate that identifies the content inspection engine which created the Downloadable security profile. Additional content inspection engines may generate and link additional Downloadable security profiles to the Downloadable. Each additional Downloadable security profile may also include a certificate that identifies its creating content inspection engine. Each content inspection engine preferably creates a Downloadable ID that identifies the Downloadable to which the Downloadable security profile corresponds. The protection includes a Downloadable interceptor for receiving a Downloadable, a file reader coupled to the interceptor for determining whether the Downloadable includes a Downloadable security profile, an engine coupled to the file reader for determining whether to trust the Downloadable security profile, and a security policy analysis engine coupled to the verification engine for comparing the Downloadable security profile against a security policy if the engine determines that the Downloadable security profile is trustworthy. A Downloadable ID verification engine retrieves the Downloadable ID that identifies the Downloadable to which the Downloadable security profile corresponds, generates the Downloadable ID for the Downloadable and compares the generated Downloadable to the linked Downloadable. The protection engine further includes a certificate authenticator for authenticating the certificate that identifies a content inspection engine which created the Downloadable security profile as from a trusted source. The certificate authenticator can also authenticate a certificate that identifies a developer that created the Downloadable.

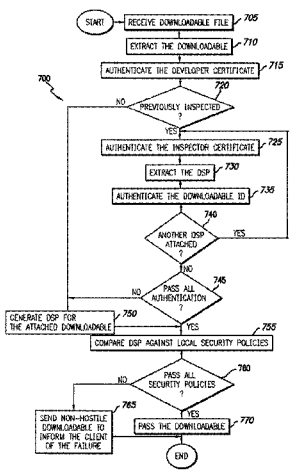

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 32 and 42 is confirmed.

Claims 1-31, 33-41, 43 and 44 were not reexamined.

\* \* \* \* \*